United States Patent
Oesterling et al.

(10) Patent No.: US 7,342,483 B2
(45) Date of Patent: Mar. 11, 2008

(54) METHOD FOR CONTACTING STOLEN VEHICLES

(75) Inventors: Christopher L. Oesterling, Troy, MI (US); Andrea K. Suurmeyer, Farmington Hills, MI (US); William A. Douglass, Jr., Berkley, WI (US)

(73) Assignee: General Motors corporation, Detroit, MI (US)

( * ) Notice: Subject to any disclaimer, the term of this patent is extended or adjusted under 35 U.S.C. 154(b) by 384 days.

(21) Appl. No.: 10/911,154

(22) Filed: Aug. 3, 2004

(65) Prior Publication Data

US 2006/0031011 A1 Feb. 9, 2006

(51) Int. Cl.
*B60R 25/10* (2006.01)

(52) U.S. Cl. .............................. 340/426.2; 340/426.18; 342/357.07; 342/357.1; 455/456.1; 701/213

(58) Field of Classification Search ............. 340/426.1, 340/426.2, 426.18, 426.19, 426.21; 701/213; 342/357.1, 457, 357.07; 455/456.1, 404.1
See application file for complete search history.

(56) References Cited

U.S. PATENT DOCUMENTS

| | | | |
|---|---|---|---|
| 4,818,998 A * | 4/1989 | Apsell et al. | 342/444 |
| 6,046,687 A * | 4/2000 | Janky | 340/988 |
| 6,876,858 B1 * | 4/2005 | Duvall et al. | 455/456.1 |

* cited by examiner

*Primary Examiner*—Brent A. Swarthout

(57) ABSTRACT

A method and system for locating a stolen vehicle includes the steps of receiving at least one stolen vehicle input associated with the stolen vehicle at a call center and assigning a first ping rate responsive to the input. An automated request is sent in accordance with the ping rate over a first predetermined time period from the call center to a telematics unit of the stolen vehicle using a wireless network.

13 Claims, 3 Drawing Sheets

METHOD FOR CONTACTING STOLEN VEHICLES

FIELD OF THE INVENTION

This invention relates generally to methods of communication with telematics systems. In particular, the invention relates to contacting vehicles.

BACKGROUND OF THE INVENTION

Telematics devices, when used in conjunction with GPS devices, provide an opportunity to monitor the location of vehicles, including stolen vehicles. However, current methods require significant human interaction to attempt to contact the vehicle to request that it report its location. These current methods require manual attempts to contact the vehicle at certain intervals of time and do not determine if a connection is possible prior to the attempt.

It is therefore desirable to provide a method for contacting stolen vehicles that overcomes the limitations, challenges, and obstacles described above.

SUMMARY OF THE INVENTION

One aspect of the present invention provides a method for locating a stolen vehicle. The method includes receiving at least one stolen vehicle input at a call center and assigning a first ping rate responsive to the input. An automated request is sent in accordance with the ping rate over a first predetermined time period from the call center to a telematics unit of the stolen vehicle using a wireless network.

Another aspect of the present invention provides a method for locating a stolen vehicle. The method includes receiving a plurality of stolen vehicle inputs and assigning a priority factor to each stolen vehicle input. The priority factor for each stolen vehicle input is modified based on a trigger event.

A third aspect of the present invention provides a computer readable medium storing a computer program for assisting in locating a stolen vehicle. The medium includes computer readable code for receiving a plurality of stolen vehicle inputs and computer readable code for assigning a priority factor to each stolen vehicle input. The medium further includes computer readable code for modifying the priority factor for each stolen vehicle input based on a trigger event.

The aforementioned and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
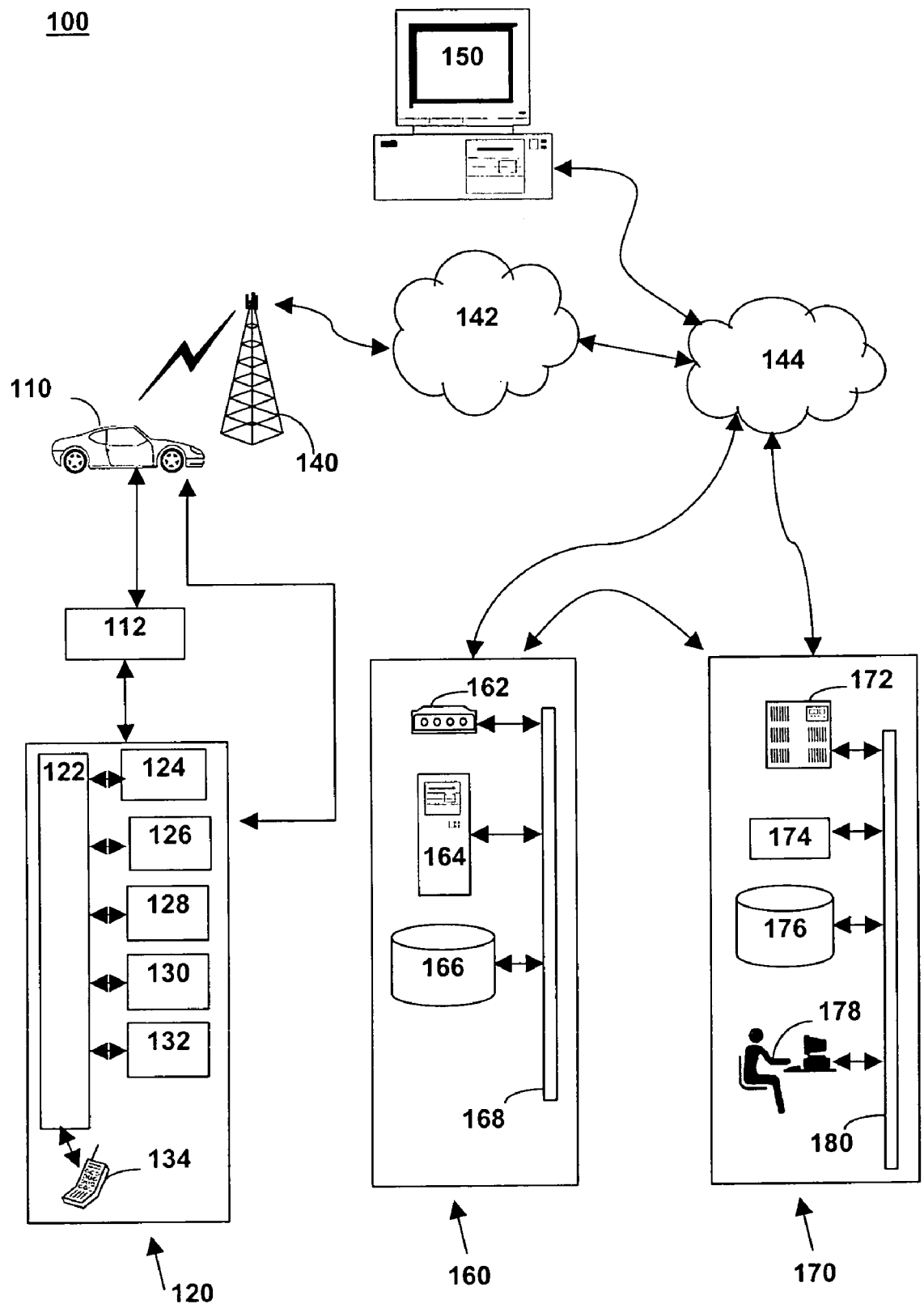
FIG. 1 is a schematic diagram of one embodiment of a system for locating stolen vehicles in accordance with the present invention.

FIG. 1 illustrates one embodiment of a system for locating stolen vehicles in accordance with the present invention at 100. System 100 includes a mobile vehicle communication unit (MVCU) 110; a vehicle communication network 112; a telematics unit 120; one or more wireless carrier systems 140; one or more communication networks 142; one or more land networks 144; one or more client, personal, or user computers 150; one or more web-hosting portals 160; and one or more call centers 170. In one embodiment, MVCU 110 is implemented as a mobile vehicle equipped with suitable hardware and software for transmitting and receiving voice and data communications. In an example, a display is embedded in MVCU 110. The display is a dialed digital display such as a radio unit or an instrument panel. MVCS 100 may include additional components not relevant to the present discussion.

MVCU 110 is referred to as a mobile vehicle in the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion.

In one embodiment, processor 122 is implemented as a microcontroller, microprocessor, controller, host processor, or vehicle communications processor. In an example, processor 122 is implemented as an application-specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160, and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Computer 150 sends user preferences to web-hosting portal 160 through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. Modem 162 can reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends data transmissions to or receives data transmissions from one or more databases 166 via network system 168. Web server 164 includes computer applications and files for managing and storing personalization settings supplied by the client, such as door lock/unlock behavior, radio station preset selections, climate controls, custom button configurations, and theft alarm settings. For each client, the web server potentially stores hundreds of preferences for wireless vehicle communication, networking, maintenance, and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170 and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends data transmissions to or receives data transmissions from one or more communication services databases 176 via network system 180. Communication services manager 174 sends data transmissions to or receives data transmissions from one or more communication services advisors 178 via network system 180. Communication services database 176 sends data transmissions to or receives data transmissions from communication services advisor 178 via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 can provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics unit 120 in MVCU 110 through wireless carrier system 140, communication network 142, land network 144, and web-hosting portals 160 using voice transmissions. In an alternative embodiment, communication services manager 174 communicates with telematics unit 120 in MVCU 110 through wireless carrier system 140, communication network 142, land network 144, and web hosting portals 160 using voice transmissions. Switch 172 selects between voice transmissions and data transmissions.

Figure 2:
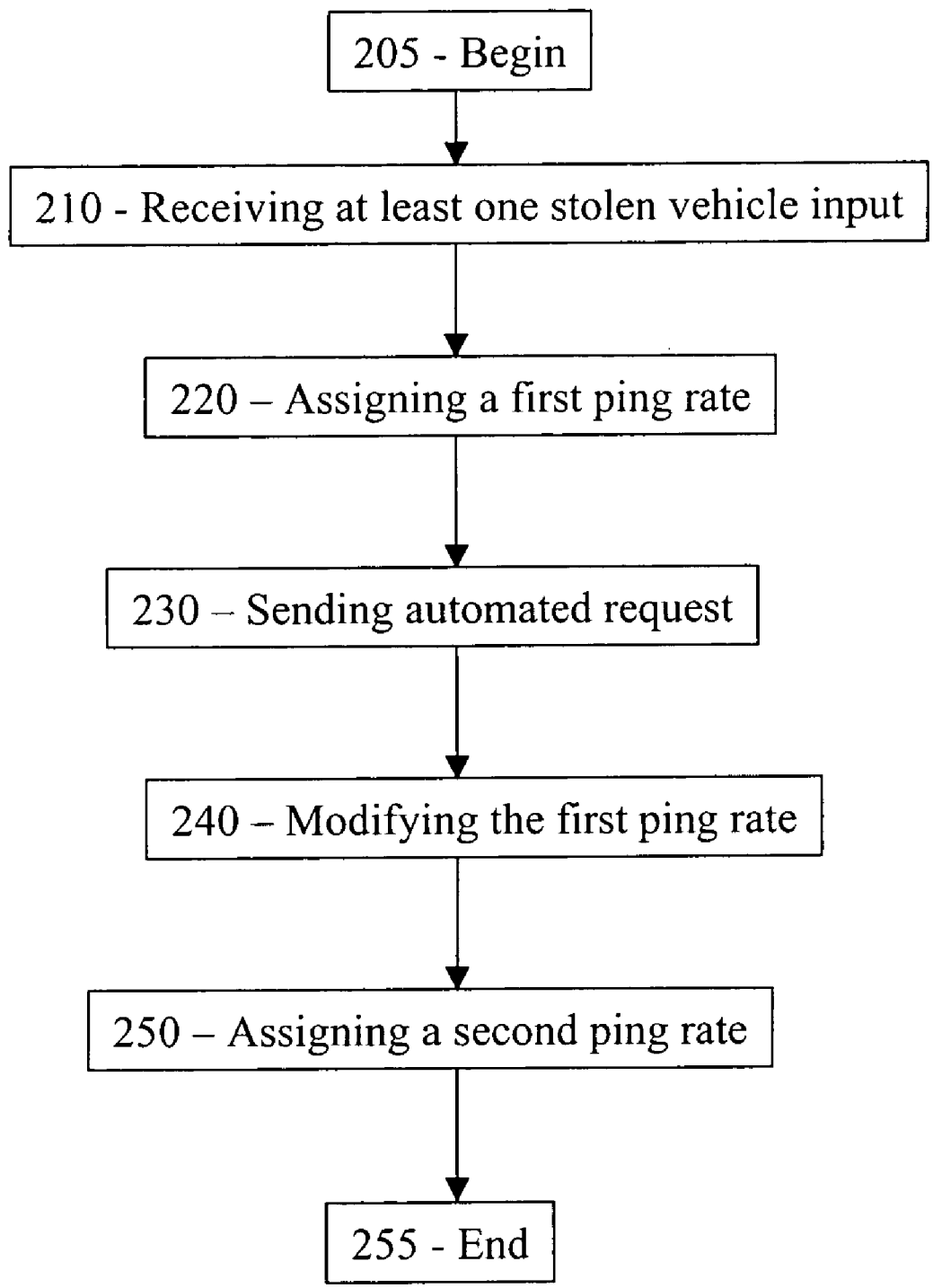
FIG. 2 is a flowchart representative of one embodiment of a method for locating stolen vehicles in accordance with the present invention.

FIG. 2 illustrates a flowchart 200 representative of one embodiment of a method for locating a stolen vehicle. The term "stolen vehicle" as used herein is defined broadly as any vehicle whose location is not known to the legal owner of the vehicle, or any vehicle whose location has been obfuscated by the legal owner of the vehicle. "Vehicle" is any vehicle, such as MVCU 110 as described above. Method 200 begins at 205.

At step 210, at least one stolen vehicle input is received. In one embodiment, the stolen vehicle input is received at a call center, such as, for example, call center 170 described above. The stolen vehicle input results from, for example, communications from the owner of the vehicle, another interested party such as an insurance company, or the police or other authority. The stolen vehicle input, in one embodiment, is added to a database of stolen vehicle inputs maintained, for example, at or in communication with, the call center. In one embodiment each stolen vehicle input is associated with one vehicle.

At step 220, a first ping rate is assigned to the received stolen vehicle input. A ping rate, as used herein, is a frequency or predetermined length of time at which the call center will attempt to contact the vehicle associated with the stolen vehicle input. For example, a ping rate is 15 minutes, implying that the call center will attempt to contact the vehicle associated with the stolen vehicle input every 15 minutes. In another example, the ping rate is four times every twenty-four hours. The first ping rate is assigned responsive to a priority factor, in one embodiment.

A priority factor is defined as any factor that affects the priority of attempting to contact a vehicle associated with a stolen vehicle report. In one embodiment, a priority factor is the time elapsed since the receipt of the stolen vehicle report, termed a report time factor. In another embodiment, a priority factor is responsive to a cellular registration report. In another embodiment, a priority factor is responsive to a communication capacity report. In another embodiment, the report time factor is a function of the last time the vehicle was seen.

The report time factor provides, for example, a greater priority factor to attempting to contact vehicles associated with recently received stolen vehicle reports. Thus, for example, in the first 48 hours after the call center receives a stolen vehicle report, the priority factor for the received stolen vehicle report will be higher than the priority factor for the same stolen vehicle report after 6 months.

The cellular registration report factor provides, for example, a greater priority factor to vehicles associated with a stolen vehicle report whose telematics units have registered on a cellular network. As is known in the art, when a telematics unit is powered, the telematics unit registers with a communications service provider, and this communications service provider notes this registration in a registration database. Mining this registration database for cellular registrations associated with vehicles results in a cellular registration report that is sent to the call center, and this cellular registration report is a priority factor in one embodiment of the invention. Methods of data mining are known to those of ordinary skill in the art.

The communication capacity report provides, for example, a greater priority factor to stolen vehicle reports when the communication capacity of the call center is not met. In one embodiment, the communication capacity report is a modem capacity report. Thus, in one embodiment of the invention, the call center monitors the availability of a communication channel, and if a channel is available, the priority factor for a stolen vehicle report is increased.

At step 230, an automated request is sent to a vehicle associated with the ping rate over a first predetermined time period from the call center to a telematics unit of the stolen vehicle using a wireless network. In one embodiment, the automated request requests that the telematics unit obtain a GPS location of the vehicle and report the GPS location to the call center. In one embodiment, the GPS location reported to the call center is then provided to police or other authorities.

At step 240, the first ping rate is modified in response to the sent automated request. In one embodiment, the modification to the first ping rate comprises increasing the first ping rate. In another embodiment, the modification to the first ping rate comprises decreasing the first ping rate, while in other embodiments, the first ping rate is not modified.

At step 250, a second ping rate is assigned to the stolen vehicle report associated with the period after expiration of the first predetermined time period. In one embodiment, the first predetermined time period is set as 48 hours, and after expiration of the 48 hours, a second ping rate is assigned to the stolen vehicle report. This step may be repeated at predetermined time periods to increase or decrease the ping rate such that, for example, a first ping rate is assigned to a stolen vehicle report for the first 48 hours after the stolen vehicle report is received, a second ping rate is assigned for the two weeks following the first 48 hours, a third ping rate is assigned for the month following the two weeks, etc.

At step 255, method 200 ends.

Figure 3:
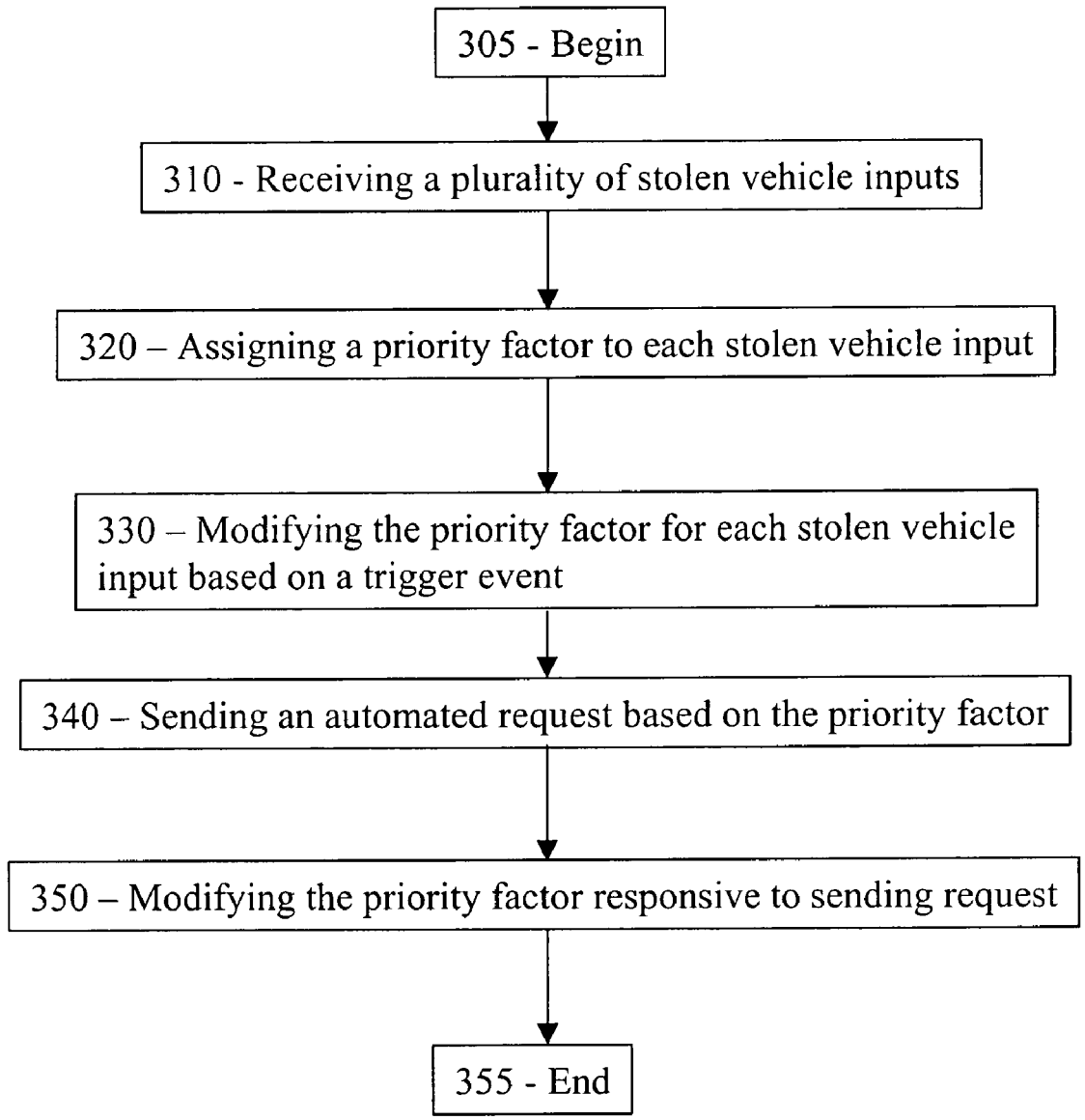
FIG. 3 is a flowchart representative of one embodiment of a method for locating stolen vehicles in accordance with the present invention.

FIG. 3 illustrates a flowchart 300 representative of one embodiment of a method for locating a stolen vehicle. Method 300 begins at step 305.

At step 310, a plurality of stolen vehicle inputs is received. In one embodiment, call center 170 receives the plurality of stolen vehicle reports. In one embodiment, call center 170 organizes the plurality of stolen vehicle reports in a stolen vehicle report database. In one embodiment, the stolen vehicle report database is sortable in response to a priority factor.

At step 320, a priority factor is assigned to each stolen vehicle report. The priority factors are the same priority factors as described above with respect to step 220, in one embodiment.

At step 330, the priority factor for a stolen vehicle report is modified based on a trigger event. A trigger event is any event that affects the priority factor. In one embodiment, the trigger event is a cellular registration report such as a reported registration of a telematics unit associated with a vehicle associated with a stolen vehicle report. In another embodiment, the trigger event is a communication capacity report indicating available communication capacity. In another embodiment, the trigger event is expiration of a predetermined time period as described above in step 250.

At step 340, an automated request based on the priority factor is sent from the call center to a telematics unit of a vehicle associate with the stolen vehicle report. The automated request is sent using a wireless network. At step 350, the priority factor of a stolen vehicle report is modified responsive to the sending of the automated request.

Method 300 ends at block 355.

Methods 200 and 300 are implemented as a computer readable medium storing a computer program for accomplishing the method steps described above in other embodiments of the invention.

In the event that methods 200 or 300 successfully contact a vehicle associated with a stolen vehicle report and obtain the GPS location of the vehicle, this information, in one embodiment, is sent to a vehicle tracking team for human monitoring. In another example, the time stamp of the reported GPS location is compared to the current time to determine the agedness of the GPS location. In one embodiment, the telematics unit is further queried for diagnostic purposes, such as determining whether an antenna is disabled or electronic systems failed. In one embodiment, further action is taken in response to the results of the diagnostic queries. For example, an instruction to no longer start the engine is sent from the call center to a located vehicle in response to diagnostic queries illustrating that the GPS has been disabled or is no longer functional. In another example, the vehicle is instructed to attempt to contact the call center on each successive ignition cycle.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for locating a stolen vehicle, the method comprising:
    receiving at least one stolen vehicle input associated with the stolen vehicle at a call center;
    assigning a first ping rate responsive to the input based on a priority factor that is one of a cellular registration report and a communication capacity report;
    sending an automated request in accordance with the ping rate over a first predetermined time period from the call center to a telematics unit of the stolen vehicle using a wireless network.

2. The method of claim 1 wherein the at least one input comprises a plurality of inputs.

3. The method of claim 1 further comprising modifying the first ping rate in response to the cellular registration report.

4. The method of claim 1 wherein the communication capacity report comprises a modem capacity report.

5. The method of claim 1 further comprising assigning a second ping rate associated with the period after expiration of the first predetermined time period.

6. A computer readable medium storing a computer program for assisting in locating a stolen vehicle, the medium including computer readable code comprising:
    instructions for receiving at least one stolen vehicle input at a call center;
    instructions for assigning a first ping rate responsive to the input, wherein the ping rate is based on a priority factor that is one of a cellular registration report and a communication capacity report; and
    instructions for sending an automated request in accordance with the ping rate over a first predetermined time period from the call center to a telematics unit of the stolen vehicle using a wireless network.

7. The medium of claim 6 further comprising instructions for modifying the ping rate in response to a stolen vehicle associated with the cellular registration report.

8. The medium of claim 6 further comprising instructions for assigning a second ping rate associated with the period after expiration of the first predetermined time period.

9. A method for locating a stolen vehicle, the method comprising:
    receiving a plurality of inputs associated with the stolen vehicle at a call center;
    assigning a first ping rate responsive to the input based on a priority factor comprising a cellular registration report;
    sending an automated request in accordance with the ping rate over a first predetermined time period from the call center to a telematics unit of the stolen vehicle using a wireless network.

10. The method of claim 9 wherein the priority factor further comprises a report time factor.

11. The method of claim 9 further comprising modifying the first ping rate in response to receipt of a cellular registration report.

12. The method of claim 9 wherein the priority factor further comprises a communication capacity report.

13. The method of claim 12 wherein the communication capacity report further comprises a modem capacity report.

* * * * *